Feb. 13, 1973 H. F. LANGE ET AL 3,716,258
TURNBUCKLE BODY
Filed Jan. 20, 1971
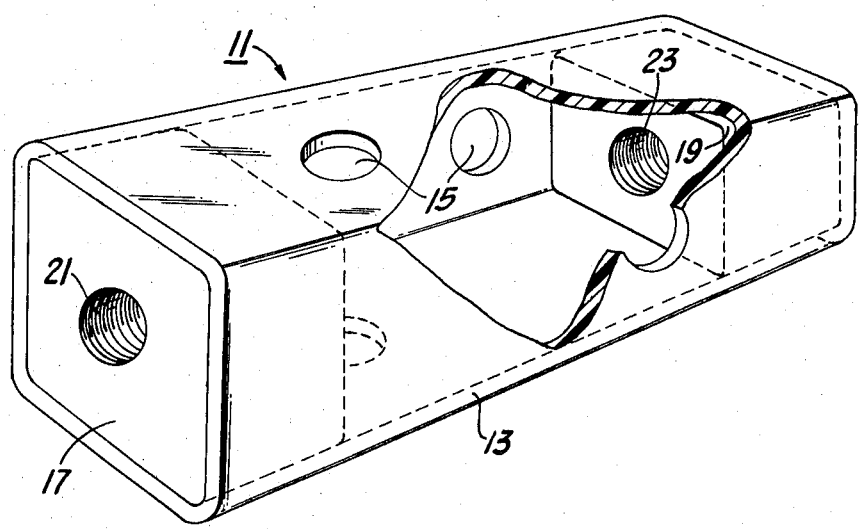
INVENTORS
HENRY F. LANGE &
STUART L. ADLER
BY
Sherman H. Barber
Attorney

3,716,258
TURNBUCKLE BODY
Henry F. Lange, 24 Merion Road, Cherry Hill, N.J. 08034, and Stuart L. Adler, 1 Dorchester Drive, Apt. 602, Pittsburgh, Pa. 15241
Filed Jan. 20, 1971, Ser. No. 108,083
Int. Cl. F16b 7/06
U.S. Cl. 287—60                    1 Claim

ABSTRACT OF THE DISCLOSURE

A length of fiber reinforced plastic tubing, which may have a round, square or rectangular cross section, is plugged at both ends by axially threaded blocks that are fixed in the end portions of the plastic tubing. The tubing has a plurality of perforations in it and the blocks are right and left hand threaded.

BACKGROUND OF THE INVENTION

This invention relates to turnbuckles in general and, more particularly, to those which are applicable to uses in the electrical industry where desired dielectric properties, desired non-corrosive properties and desired high tension characteristics are not readily available in conventional turnbuckles.

Turnbuckles that are made of metal are not entirely satisfactory in all applications, particularly in the electrical industry. There, for example, a turnbuckle that has no metal or a small amount of metal in its construction is desirable. One such use is in taking up slack in a metal or plastic guy strain cable. While this is only one example, those skilled in the art will quickly recognize features and advantages of the turnbuckle body of the invention, which may or may not have metal end portions.

The present invention is directed to such a novel turnbuckle body that has the aforementioned desired properties and characteristics.

SUMMARY OF THE INVENTION

A turnbuckle body comprises a discrete length of fiber reinforced resin tubing having one or more holes therethrough and a resin block, having an axial threaded hole, fixed in each end portion of the tubing.

BRIEF DESCRIPTION OF THE DRAWING

The drawing is a perspective view, partly cut away to illustrate details, of a turnbuckle in accordance with the invention.

DETAILED DESCRIPTION

The drawing illustrates a form of turnbuckle body 11, without rods which are conventional and which cooperate therewith, that is made of fiber glass reinforced plastic tubing 13, such as the tubing manufactured and marketed by Koppers Company, Inc. under the trademark Extren. While the tubing 13 is shown as having a rectangular cross section, it should be understood that the tubing 13 may have any other cross sectional shape, such as square, round or even oval.

The tubing 13 is provided with a plurality of holes 15 which enable a workman to insert a bar which acts as a lever to tighten the turnbuckle body 11 and also which serve as sight holes for adjustment in service.

The end portions of the tubing 13 are closed by plastic or metallic blocks 17, 19 and the blocks 17, 19 have axial threaded holes 21, 23 respectively therein. If the thread of one hole 21 say, is right hand, then, the thread of the other hole 23 is left hand, which is conventional in other types of turnbuckles.

If the end blocks 17, 19 are plastic, they may be adhesively secured in position, but if they are metal, they may be secured in position by suitable conventional fasteners well known to those skilled in the art.

A feature of the invention is that such a turnbuckle is relatively less costly than conventional turnbuckles.

A feature of the invention is that such a plastic turnbuckle body has improved dielectric, non-conductive and tension loading properties which are particularly desirable of turnbuckles in the electrical industry.

A feature of the invention is that such a turnbuckle has a high tensile stress value which makes it particularly useful in many applications not necessarily limited to the electrical industry.

Although the invention has been described herein with a certain degree of particularity it is understood that the present disclosure is made only as an example and that the scope of the invention is defined by what is hereinafter claimed.

What is claimed is:
1. A turnbuckle body comprising:
   (a) a discrete length of fiber reinforced resin tubing square in cross section having four walls defining a hollow therein, a hole formed in each said wall communicating with the inside thereof; and
   (b) a block having an axial hole therethrough fixed in each end portion of said tubing;
   (c) said blocks being spaced from each other and having said holes in said walls therebetween;
   (d) the hole in one said block threaded right hand; and
   (e) the hole in the other said block threaded left hand; and
   (f) said holes in said walls communicating with the space between said blocks.

References Cited
UNITED STATES PATENTS

| | | | |
|---|---|---|---|
| 1,069,051 | 7/1913 | Woodlock | 174—177 |
| 2,213,922 | 9/1940 | Stewart | 174—179 X |
| 2,289,197 | 7/1942 | Jones | 174—178 |
| 2,661,390 | 12/1953 | Gelpi | 174—178 |
| 2,928,893 | 3/1960 | Burnham | 174—178 |
| 2,816,783 | 12/1957 | Robertson | 287—60 |

ANDREW V. KUNDRAT, Primary Examiner

U.S. Cl. X.R.
174—177